United States Patent [19]
Chau

[11] Patent Number: 6,068,764
[45] Date of Patent: May 30, 2000

[54] REVERSE OSMOSIS PUMP AND SHUT OFF VALVE

[76] Inventor: Yiu Chau Chau, 80 West Beaver Creek Road, Unit 14, Richmond Hill, Ontario, Canada, L4B 1H3

[21] Appl. No.: 09/127,217

[22] Filed: Jul. 31, 1998

Related U.S. Application Data

[63] Continuation-in-part of application No. 09/033,819, Mar. 3, 1998, abandoned.

[51] Int. Cl.[7] ............................ B01D 61/10; F04B 35/00; F04B 7/02
[52] U.S. Cl. .................. 210/136; 210/257.2; 210/416.1; 417/295; 417/313; 417/404; 417/536
[58] Field of Search .................................... 210/110, 116, 210/136, 257.1, 258, 416.1, 416.3, 257.2; 417/295, 313, 403, 404, 405, 415, 536

[56] References Cited

U.S. PATENT DOCUMENTS

| | | |
|---|---|---|
| 2,310,978 | 2/1943 | McGill et al. . |
| 4,242,061 | 12/1980 | Hartley ..................................... 417/536 |
| 5,203,803 | 4/1993 | Schoenmeyr ......................... 210/416.3 |
| 5,261,792 | 11/1993 | Schoenmeyr ......................... 210/257.2 |
| 5,460,716 | 10/1995 | Wolbers .................................. 210/136 |
| 5,503,736 | 4/1996 | Shoenmeyr .......................... 210/416.3 |

OTHER PUBLICATIONS

Welcome Watertec Enterprise Inc., Internet printout, 10 pages, undated.
"Owners Manual, Undersink Reverse Osmosis Drinking Water System", Ecowater Systems, St. Paul, MN, pp. 1–17 & 20, Mar. 1996.
"Finally, an RO System That Does What It's Supposed to Do. And More"; Water Technology, pp. 53 and 54, Nov. 1996.
"Permeate Pump Installation Instructions"; Aguatec, Irvine, CA, 2 pages, undated.

Primary Examiner—Joseph W. Drodge
Attorney, Agent, or Firm—Cook, Alex, McFarron, Manzo, Cummings & Mehler, Ltd.

[57] ABSTRACT

In one embodiment a reverse osmosis permeate pump with shut off valve and reverse osmosis system employs bypassed feed water from the reverse osmosis membrane to drive a water wheel and gear set to reciprocate a piston back and forth between two chambers in the pump. Permeate from the membrane is introduced to the respective chambers by a pair of fluid inlets and discharged from the respective chambers through a pair of discharges to a storage tank. Flow through these respective inlets and discharges is a function of the direction in which the piston is moving and whether it is imparting a pressure or suction on a given chamber. A second piston is exposed to the pressure in the discharges from the chambers and the second piston moves between a position permitting incoming feed flow to the membrane, and a position blocking that flow upon increase in pressure in the fluid discharge from the chambers. In another embodiment, the reverse osmosis permeate pump is powered by an independent source of power. In both embodiments, the pump and shut off valve is on the permeate side of the membrane which permits a substantial reduction in pump size, and the permeate pumps and shut off valves of the invention permit substantially increased pressure drops across the membrane and increased system production capacities and rates.

16 Claims, 2 Drawing Sheets

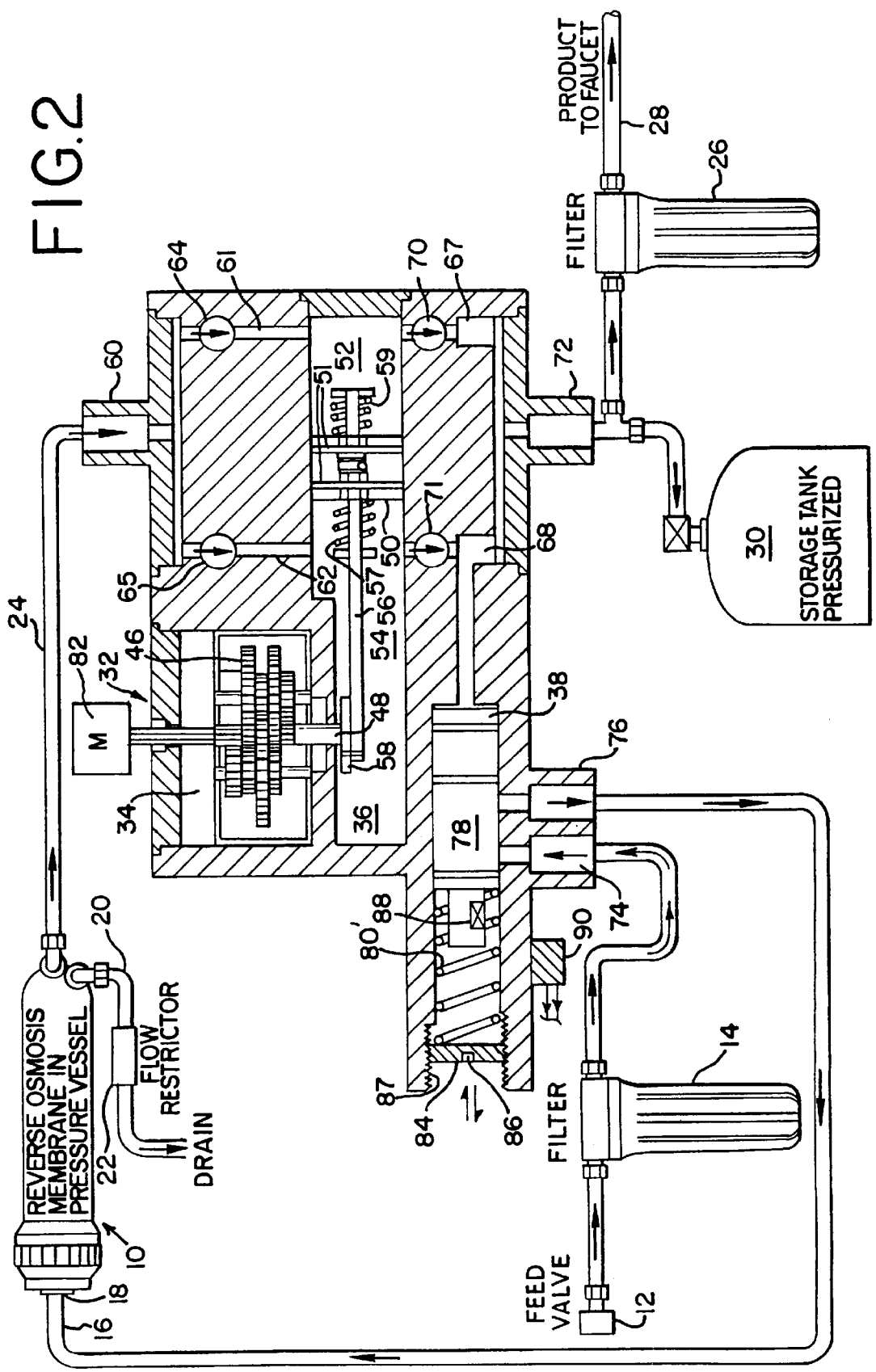

REVERSE OSMOSIS PUMP AND SHUT OFF VALVE

This application is a continuation-in-part of application Ser. No. 09/033,819, filed on Mar. 3, 1998, now abandoned.

BACKGROUND AND SUMMARY OF INVENTION

The present invention is directed to pumps and shut off valves and, more particularly, to pumps and shut off valves for use in reverse osmosis water purification systems.

In reverse osmosis water purification systems, the feed water to be purified is supplied under pressure to one side of a reverse osmosis membrane in a pressure vessel and a pressure differential is maintained across the membrane. This differential drives the water in the feed water through the membrane to produce the desired purified permeate. A substantial percentage of the feed water input to the pressure vessel is bypassed and discharged through a flow restrictor to continuously purge the feed side of the membrane. The magnitude of the pressure differential across the membrane is important because it has a direct function on the rate and amount of water that may be purified in any given amount of time. The greater the pressure differential, the greater the amount of permeate produced per given amount of time. In view of the foregoing, it will be appreciated that for a given pressure of feed supply to be purified, it will therefore be desirable to reduce the level of back pressure on the permeate or discharge side of the membrane. Assuming a given supply pressure, each increment that the back pressure may be reduced will result in an increased rate and volume of production of permeate.

Reverse osmosis permeate pumps have been developed which are capable of reducing the back pressure to somewhat less than 5 psi. One such pump is disclosed in U.S. Pat. No. 5,460,716. It employs a diaphragm which defines a pumping chamber on one side for pumping the permeate and a working chamber on the other side which is connected to the feed water which is being bypassed. Valves are positioned to alternately admit the bypassed feed water to the working chamber of the pump and then drain it to set up a pumping action in the pumping chamber to pump the permeate. The disadvantages of such a pump is its relatively large size, its relatively discontinuous operation and the fact that back pressure reduction to only about 5 psi is possible.

Permeate reverse osmosis pumps with shut off valves constructed in accordance with the present invention are surprisingly capable of further substantial reductions in the back pressure in a reverse osmosis system and, thereby, a substantial increase in the pressure drop across the membrane with its accompanying advantages. In the pumps and shut off valves of the present invention, the back pressure may actually be reduced to zero and in many cases as low as substantial negative pressure. This, of course, results in a substantial increase in rate of production of permeate compared to the prior systems having a back pressure reduction of only down to about 5 psi. Moreover, in the pumps and shut off valves of the present invention, the size and pumping capacity of the pump may be reduced to as little as a quarter to a half of the prior pumps, the pumping of permeate is substantially continuous rather than discontinuous, and bypass feed and drain valves of the prior systems are substantially eliminated. Moreover, a separate source of electrical or other energy is not necessary in one of the pump and shut off valve embodiments of the present invention, and the valve may be readily operated simply by the feed bypass from the pressure vessel which is to be discharged to a drain anyway, and which provides ample driving power for the embodiment of the pump and shut off valve of the present invention. In another embodiment of pump and shut off valve of the present invention, the pump may be powered by a source of energy other than the bypassed brine and is capable of producing substantial negative pressures across the membrane of much larger magnitude than were previously known while enjoying a substantial reduction in pump size and capacity.

In one principal aspect of the present invention, a pump and shut off valve comprise a pumping compartment, a feed supply compartment and a drive including a drive shaft which is driven by the drive and extends into the pumping compartment. A piston in the pumping compartment divides the pumping compartment into first and second chambers, and a drive transmitting connector extends between the drive shaft and the piston to reciprocally move the piston toward and away from the first and second chambers, respectively, to alternately increase and decrease the volume in the respective chambers. First and second fluid inlets for introducing a fluid to the first and second chambers, respectively, and first and second fluid discharges for discharging the fluid from the first and second chambers, respectively, are also provided. A check valve in each of the first and second fluid inlets permits the flow of fluid to each of the chambers, but prevents the flow from each of the chambers, a check valve in each of the first and second fluid discharges permits the flow of fluid from each of the chambers, but prevents the flow to each of the chambers, and the first and second discharges communicate with the feed supply compartment. A fluid inlet to the feed supply compartment for introducing a fluid to the feed supply compartment and a fluid discharge from the feed supply compartment for discharging the fluid from the feed supply compartment are also provided. A valve in the feed supply compartment is movable in response to a decreased fluid pressure in the first and second discharges from the first and second chambers to permit the flow of fluid between the fluid inlet and discharge of the feed supply compartment, and in response to an increased fluid pressure in the first and second discharges from the first and second chambers to block the flow of fluid between the fluid inlet and discharge of the feed supply compartment.

In another principal aspect of the present invention, the check valve in the first inlet and the check valve in the second discharge close and fluid is discharged from the first chamber through the first discharge and introduced to the second chamber through the second inlet when the piston moves toward the first chamber, and the check valve in the second inlet and the check valve in the first discharge close and fluid is discharged from the second chamber through the second discharge and introduced to the first chamber through the first inlet when the piston moves toward the second chamber.

In still another principal aspect of the present invention, the aforementioned pump and shut off valve includes a drive compartment, a first fluid inlet to the drive compartment for introducing a fluid to the drive compartment, and a fluid discharge from the drive compartment for discharging the fluid from the drive compartment. The drive is positioned in the drive compartment and includes a drive mechanism which is driven by contact with the fluid which passes through the drive compartment. A transmission which is powered by the drive mechanism and which drives the drive shaft.

In still another principal aspect of the present invention, the drive mechanism comprises a wheel which is rotated by the fluid which passes through the drive compartment, and the transmission is a gear set.

In still another principal aspect of the present invention, the drive includes a motor which is coupled to the drive shaft to drive it.

In still another principal aspect of the present invention, the drive transmitting connector is a crank arm.

In still another principal aspect of the present invention, the valve in the feed supply compartment comprises a piston which moves reciprocally in the compartment between a first position in which the flow of fluid between the fluid inlet and discharge of the third compartment is permitted, and a second position in which the flow of fluid between the fluid inlet and discharge of the feed supply compartment is blocked.

In still another principal aspect of the present invention, a spring is positioned in the third compartment which urges the valve toward the first position in one embodiment and toward the second position in another embodiment.

In still another principal aspect of the present invention, the pump and shut off valve are in combination with a reverse osmosis water purification system which includes a reverse osmosis membrane in a pressure vessel having a feed inlet, a feed discharge and a permeate discharge, and a tank for receiving the permeate from the permeate discharge, and wherein a source of feed to be purified communicates with the fluid inlet to the feed supply compartment, the feed to be purified from the fluid discharge from the feed supply compartment communicates with the feed inlet of the vessel, the permeate from the permeate discharge of the vessel communicates with the first and second fluid inlets for introducing fluid to the first and second chambers, and the permeate from the first and second fluid discharges for discharging the fluid from the first and second chambers, respectively, communicates with the tank.

In still another principal aspect of the present invention, in the last mentioned combination with a reverse osmosis purification system, the feed discharge of the vessel communicates with the earlier mentioned drive compartment to drive the drive.

In still another principal aspect of the present invention, the valve shuts off the feed to be purified when the tank is full of permeate and increases in pressure.

These and other objects, features and advantages of the present invention will be more clearly understood through a consideration of the following detailed description.

BRIEF DESCRIPTION OF THE DRAWINGS

In the course of this description, reference will frequently be made to the attached figures in which:

FIG. 2 is also a schematic diagram of a reverse osmosis water purifying system incorporating a second preferred embodiment of permeate pump and shut off valve incorporating the principles of the present invention.

Figure 1:
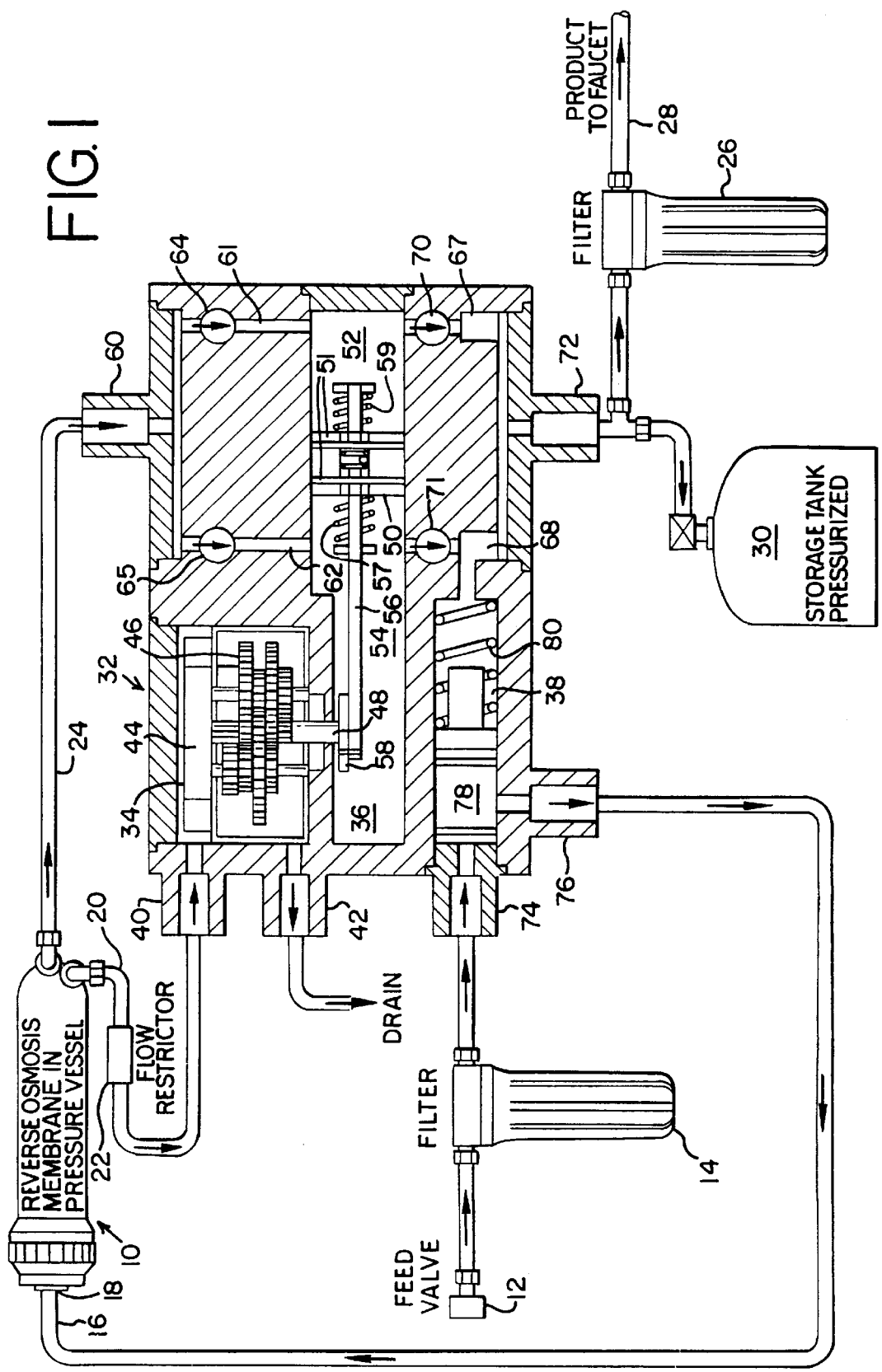
FIG. 1 is a schematic diagram of a reverse osmosis water purifying system incorporating one preferred embodiment of permeate pump and shut off valve incorporating the principles of the present invention.

DESCRIPTION OF THE PREFERRED
EMBODIMENTS

With particular reference to FIG. 1, a reverse osmosis membrane water purification system is shown which includes a pressure vessel 10 which contains a reverse osmosis membrane (not shown) through which water will pass when the membrane is exposed to a pressurized feed solution which is to be purified and to a pressure drop across the membrane. The feed solution which is to be purified is supplied from a pressurized source of supply through a feed control valve 12. The source of supply may be any one of a number of sources, such as a natural body of water or a well, and is pressurized by a pump or the like (not shown). The feed water from the valve 12 is preferably passed through a filter 14 to filter out large particulate contaminants, and then through a conduit 16 to a feed inlet 18 into the pressure vessel 10. A certain proportion of the feed water, for example about 75% of the feed input to the vessel, is typically bypassed from the feed side of the membrane through a conduit 20 and flow restrictor 22 to a drain to continuously flush the feed side of the membrane. The remaining approximately 25% of the water in the feed input passes through the membrane to produce the desired purified permeate. This permeate is then conducted from the vessel 10 via a permeate conduit 24 from where it may pass, preferably through another filter 26 and conduit 28, to a tap or faucet or to a storage tank 30 to be stored for future use. The percentages of bypass and permeate are only given by way of example and may vary widely in any given system.

Some sort of a pump and shut off valve have been employed in reverse osmosis water purification systems of the type described to pump the permeate under pressure to the storage tank to maximize to the extent possible the pressure drop across the membrane. The greater the pressure drop, the greater the production rate of permeate. Such prior pumps and shut off valves also shut down the system when the tank has been filled and the back pressure increases. However, as previously discussed, these prior permeate pumps and valves have only, at best, been capable of reducing the permeate back pressure at the membrane to around 5 psi during operation of the system. In contrast, the permeate pump and shut off valve of the embodiment of the present invention as seen FIG. 1 is capable of reducing such back pressure to zero and, in some cases, to even as low as a negative 5 psi, while at the same time obviating the need for a separate source of power to drive the pump and one which might be susceptible to power failure.

The pump and shut off valve of the present invention as shown in FIG. 1 preferably comprises a single housing 32 for compactness. The housing 32 is preferably divided into three compartments, a first drive compartment 34, a second pumping compartment 36, and a third feed supply compartment 38. The first drive compartment 34 has a fluid inlet 40 which is connected to the feed bypass conduit 20 and flow restrictor 22 of the typical reverse osmosis system to receive bypassed feed water and introduce it to the drive compartment 34. The drive compartment 34 also includes a fluid discharge 42 for discharging the bypassed feed water from the drive compartment 34 to a drain.

A water driven drive mechanism, for example a water wheel 44, is located in the drive compartment 34 and is driven by the bypassed feed water which continuously impinges it after being introduced into that compartment through the fluid inlet 40. As the water wheel 44 is rotated by the incoming bypassed feed water, it drives a gear set 46 which, in turn, rotates a drive shaft 48 which extends through the wall between the first compartment 34 and into the second pumping compartment 36.

A piston 50 with sealing rings 51 is positioned in the pumping compartment 36 and the piston divides that compartment into a first chamber 52 and second chamber 54 as shown in the drawing. The piston 50 is reciprocally powered back and forth in the compartment 54 and toward and away from the first and second chambers 52 and 54 by a crank arm 56 coupled to an eccentric 58 which is mounted on the rotating drive shaft 48. The crank arm 56 preferably extends through the piston 50 and carries springs 57 and 59 on the left and right sides of the piston 50 as viewed in the drawings.

An inlet coupling 60 is also positioned on the housing 32 and the inlet divides into first and second inlets 61 and 62 for introducing permeate from the coupling 60 and conduit 24 to the first and second chambers 52 and 54, respectively. The first and second inlets 61 and 62 also include check valves 64 and 65, respectively, which permit the flow of permeate in the direction shown by the arrows into the respective first and second chambers 52 and 54, but prevent flow in the opposite direction. First and second discharges 67 and 68 are also provided from the respective first and second chambers 52 and 54, and each of these discharges also contains check valves 70 and 71. The check valves 70 and 71 permit the flow of permeate from the respective chambers 52 and 54 in the direction shown by the arrows, but prevent flow in the opposite direction. As shown in the drawing, the first and second discharges 67 and 68 communicate both with the feed supply compartment 38 and with a discharge coupling 72 on the housing 32, the latter of which conveys the permeate from the pump and shut off valve of the invention either to the conduit 28 for current service use or to the storage tank 30.

The feed supply compartment 38 also includes a fluid inlet 74 for introducing the feed which is to be treated from its source of supply and feed valve 12 to the compartment 38, and a fluid discharge 76 for discharging the feed from the compartment 38 through conduit 16 and feed inlet 18 to the pressure vessel 10 for treatment. A second piston 78 is positioned in the compartment 38 for reciprocal movement therein. The piston 78 is slightly biased to the left and in flow blocking direction between the inlet 74 and discharge 76, as shown in the drawing, by a spring 80 which may exert a force of, for example, about 5 psi against the piston 78 in the flow blocking direction. If only the force of spring 80 is exerted against the right side of the piston 78, it will be insufficient to hold the piston 78 in its flow blocking condition against the normal service pressure of, for example, 40–60 psi, and that service pressure will force the piston 78 to the right and maintain it out of flow blocking relationship between the inlet 74 and discharge 76.

Although it is believed from the foregoing description that the operation of the pump and shut off valve and system of the present invention will be understood by those stilled in the art, a brief description of the operation follows.

Upon start up of the system, the storage tank 30 will be empty or only partially filled and ready to accept permeate. The feed valve 12 to a pressurized source of supply of the feed water to be purified is opened, and the feed will pass through the filter 14 and fluid inlet 74 into the feed supply compartment 38 of the shut off valve of the invention, and will exert a supply line pressure of, for example, 40–60 psi against the left side of piston 78. Because the spring force exerted by spring 80 is substantially less than the line pressure, the piston 78 will move to the right in compartment 38 to permit flow of the incoming feed solution between the fluid inlet 74 and discharge 76 from compartment 38. This feed will then flow through conduit 16 and feed inlet 18 into the pressure vessel 10 and to the feed side of the membrane.

As previously discussed, typically about 75% of the incoming feed will be bypassed through the conduit 20 and flow restrictor 22. This bypassed feed which typically would otherwise simply be discharged to a drain, instead is diverted through the fluid inlet 40 to the drive compartment 34. This bypassed feed flow is amply sufficient to rotatably drive the water wheel 44, gear set 46 and drive shaft 48. Indeed, the size and capacity of the pump may be substantially reduced because it only need pump the permeate which only comprises about 25% of the total feed to the pressure vessel 10. After driving the wheel 44, the bypassed feed will then be discharged from the drive compartment 34 through the fluid discharge 42 to a drain.

The water in the remaining approximately 25% of the feed which was introduced to the pressure vessel 10 will pass through the membrane and be discharged from the vessel as purified permeate through the conduit 24 to the inlet coupling 60 of the housing 32 of the pump and shut off valve. This permeate will then pass through the first and second inlets 61 and 62 and their respective check valves 64 and 65 to fill the first and second chambers 52 and 54. As the bypassed feed water driven drive shaft 48 rotates, it will move the piston 50 back and forth in the pumping compartment 36 via the crank arm 56 and eccentric 58. As the piston 50 moves to the right toward the first chamber 52, it will pressurize that chamber to close check valve 64 and force the permeate that had previously accumulated in that chamber through the check valve 70 and first discharge 67, and out through the discharge coupling 72. Movement of the piston 50 to the right, as viewed in the drawing, also creates a reduced pressure or suction in the second chamber 54. This will close the check valve 71 in the second discharge 68 and draw permeate into the chamber 54 through check valve 65 in the second inlet 62. In the event that in the movement of the piston 50 to the right a stronger resistance is experienced than the force exerted by the crank arm 56, the spring 57 will be compressed to dissipate the resistance to permit the crank arm 56 to continue to move to the right to complete its cycle.

In contrast, when the piston 50 reverses to move to the left as viewed in the drawing, a pressure will be imparted on the permeate which has accumulated in the chamber 54 to shut check valve 65 in inlet 62, and to pump the permeate in the chamber 54 through check valve 71 and discharge 68 out through the discharge coupling 72. In turn, a suction now will be created in the first chamber 52 as the piston 50 moves to the left. This will cause permeate to flow through the check valve 64 and first inlet 61 into the chamber 52 to fill it with permeate, and to close the check valve 70. In the event that in the movement of the piston 50 to the left a stronger resistance is experienced than the force exerted by the crank arm 56, the spring 59 will be compressed to dissipate the resistance to permit the crank arm 56 to continue to move to the left to complete its cycle.

It will be appreciated that in the piston arrangement just described, the flow of pumped permeate that is discharged to the system will be essentially continuous, unlike the pumps of the prior art. This is because when the piston 50 has completed its pumping motion in one direction, it immediately continues its pumping motion in the opposite direction.

In this arrangement, the back pressure in the permeate conduit 24 and on the permeate side of the membrane will be reduced to at least zero and, in some instances, to as little as a negative 5 psi. Thus, as previously discussed, the production rate and capacity of the permeate pump and shut off valve of the present invention is substantially improved. By way of example, if the feed line pressure into the system on the feed side of the membrane is 60 psi and the total dissolved solids content in the feed is 300, the output rate of permeate, in for example gallons, will generally vary as follows for the following back pressures:

| back pressure, psi | pressure drop across membrane, psi | flow rate, gal/time |
|---|---|---|
| 5 | 55 | 18.5 |
| 0 | 60 | 20.5 |
| −5 | 65 | 22.0 |

When enough permeate has been produced to fill the tank 30, the pressure in the fluid discharges 67 and 68 will rise to approach the level of the pressure of the incoming feed. This additional pressure will be exerted against the right side of the piston 78. When this pressure, together with the force exerted by spring 80, exceeds the incoming feed pressure, the piston 78 will move to the left, as shown in the drawing, to block the flow between the fluid inlet 74 and fluid discharge 76, and will shut down the system.

Referring now to FIG. 2, a reverse osmosis membrane water purification system is shown which has numerous similarities to that shown in FIG. 1, but in which a second embodiment of pump and shut off valve of the present invention is shown. Because many of the components shown in FIG. 2 have a substantially similar or identical counterpart in the system, pump and shut off valve as shown in FIG. 1, like reference numerals will be used to designate like elements.

In the pump and shut off valve shown in FIG. 2, the fluid inlet to the drive compartment 34 has been eliminated and the bypass conduit 20 is simply connected to the drain through the flow restrictor 22, as it has been in the past in prior conventional systems. Instead, a motor 82 which is powered by a traditional source of energy, such as electrical, is coupled to the gear set 46 to operate the piston 50 as previously described with respect to the embodiment shown in FIG. 1.

In addition, in the embodiment shown in FIG. 2, the spring 80 is reversed to the position 80' as shown in FIG. 2, and thereby tends to exert a force in a direction to the right as viewed in the drawing to open the piston valve 78, rather than close it as in the FIG. 1 embodiment. Reversal of the spring to the position 80', as shown in FIG. 2, permits opening of the valve at lower feed supply pressures than in the arrangement shown in FIG. 1 and also has the advantage that the end plate 84 may be adjusted back and forth in the direction shown by the arrows in FIG. 2, such as by slot 86 and threads 87, to adjust the force of the spring 80' and the point at which the fluid inlet 74 will be opened to communicate with the fluid discharge 76. A magnetic sensor 88 is preferably attached at the left side of the piston valve 78 so that whenever the piston valve is moved toward the end plate 84 and so as to block the flow of fluid between the fluid inlet 74 and fluid discharge 76, and as depicted in FIG. 2, the magnetic sensor 88 will activate a magnetic detector 90 to disconnect the power to the motor 82.

It will be appreciated that in the embodiment shown in FIG. 2, the pressure differential across the membrane in the pressure vessel 10 may be substantially increased over that which has been realized by the prior art and even over the improved pressure differentials which are enjoyed by the embodiment shown in FIG. 1. If the incoming feed water, for example, has a pressure of 60 psi as previously discussed, the independently powered motor 82 can create a permeate back pressure of as much as a negative 40 psi at the membrane. In this case, the pressure drop across the membrane would be 100 psi, i.e. 60 psi plus 40 psi. In fact, the embodiment described in FIG. 2 is particularly advantageous at lower feed water pressures which might otherwise be insufficient to adequately permit operation of other shut off valve constructions and even the shut off valve construction of FIG. 1. For example, if the feed water pressure is only 40 psi and the motor 82 is able to create a permeate back pressure of a negative 40 psi, the pressure drop across the membrane will be 80 psi, and the flow rate can actually be increased to as much as 27 gallons/unit of time.

Where the pressure differential is for example 80 psi across the membrane, the compressive force of the spring 80' is preferably set at approximately that pressure differential. Thus, whenever the compartment 38 reaches a pressure of slightly greater than 80 psi, the piston valve 78 will be moved to the left so that the flow between the fluid inlet 74 and the fluid discharge 76 is blocked. When this occurs the detector 90 is activated by the magnet 88 to shut down the power to the motor 82.

In typical reverse osmosis water purification systems, the conventional placement of the booster pump is at a location after the filter 14 and before the fluid inlet 74. In such installations, it will be necessary that the booster pump be of a size and capacity to manage the total feed water which is introduced to the system. However, as previously described, as much as up to 75% of the feed input water is typically bypassed from the feed side of the membrane through the conduit 20 and flow restrictor 22 to drain so as to continuously flush the feed side of the membrane. Only the remaining approximately 25% of the feed water in the input actually passes through the membrane to produce the desired purified water as permeate. In the preferred embodiments of the present invention, as shown both in FIGS. 1 and 2, the boost of pressure of only the permeate purified water is preferred. Thus, because that water represents only approximately 25% of the total feed water which is delivered to the membrane, the drives including the water wheel 44 drive shown in FIG. 1, as well as the independently powered motor 82 in FIG. 2 need only be about 25% of the size and capacity, and utilize only about 25% of the power, as compared to the conventional booster pumps placed in the feed line to fluid inlet 74.

Although various conduits have been shown coupling various components of the reverse osmosis system, it will also be appreciated that in a fully equivalent system one or more of these conduits may be essentially eliminated, and the respective components mounted directly to each other. By way of example, the fluid discharge 76 may be mounted directly to the feed inlet 18 on the pressure vessel 10, and/or the inlet coupling 60 may be directly mounted to the permeate discharge on the pressure vessel, thereby eliminating conduits 16 and/or 24, respectively.

It will also be understood that the preferred embodiments of the present invention as have has been described are merely illustrative of the principles of the present invention. Numerous modifications may be made by those skilled in the art without departing from the true spirit and scope of the invention.

I claim:

1. A pump and shut off valve comprising:

a pumping compartment and a feed supply compartment;

a drive including a drive shaft which is driven by said drive and which extends into said pumping compartment;

a piston in said pumping compartment and dividing said pumping compartment into first and second chambers, and a drive transmitting connector between said drive shaft and said piston to reciprocally move said piston toward and away from said first and second chambers, respectively, to alternately increase and decrease the volume in the respective chambers;

first and second fluid inlets for introducing a fluid to said first and second chambers, respectively, and first and second fluid discharges for discharging the fluid from said first and second chambers, respectively;

a check valve in each of said first and second fluid inlets permitting the flow of fluid to each of said chambers but preventing the flow from each of said chambers, a check valve in each of said first and second fluid discharges permitting the flow of fluid from each of said chambers but preventing the flow to each of said chambers, and said first and second discharges communicate with said feed supply compartment;

a fluid inlet communicating with said feed supply compartment for introducing a fluid to said feed supply compartment, and a fluid discharge from said feed supply compartment for discharging the fluid from said feed supply compartment; and a valve in said feed supply compartment movable in response to a decreased fluid pressure in said first and second discharges from said first and second chambers to permit the flow of fluid between said fluid inlet and said discharge of said feed supply compartment, and in response to an increased fluid pressure in said first and second discharges from said first and second chambers to block the flow of fluid between said fluid inlet and said discharge of said feed supply compartment.

2. The pump and shut off valve of claim 1, wherein said check valve in said first inlet and said check valve in said second discharge close and fluid is discharged from said first chamber through said first discharge and introduced to said second chamber through said second inlet when said piston moves toward said first chamber, and said check valve in said second inlet and said check valve in said first discharge close and fluid is discharged from said second chamber through said second discharge and introduced to said first chamber through said first inlet when said piston moves toward said second chamber.

3. The pump and shut off valve of claim 1, including a drive compartment, a first fluid inlet to said drive compartment for introducing a fluid to said drive compartment, and a fluid discharge from said drive compartment for discharging the fluid from said drive compartment; and wherein said drive is positioned in said drive compartment and includes a drive mechanism which is driven by contact with the fluid which passes through said drive compartment, and a transmission which is powered by said drive mechanism and which drives said drive shaft.

4. The pump and shut off valve of claim 3, wherein said drive mechanism comprises a wheel which is rotated by the fluid which passes through said drive compartment, and said transmission is a gear set.

5. The pump and shut off valve of claim 3, in combination with a reverse osmosis water purification system including: a reverse osmosis membrane in a pressure vessel, said vessel having a feed inlet, a feed discharge and a permeate discharge; a tank for receiving the permeate from said permeate discharge; and wherein a source of feed to be purified communicates with said fluid inlet to said feed supply compartment; the feed to be purified from the fluid discharge from said feed supply compartment communicates with said feed inlet of said vessel; said feed discharge of said vessel communicates with said fluid inlet of said drive compartment; the permeate from the permeate discharge of said vessel communicates with said first and second fluid inlets for introducing fluid to said first and second chambers, and the permeate from said first and second fluid discharges for discharging the fluid from said first and second chambers, respectively, communicate with said tank.

6. The pump and shut off valve of claim 5, wherein said valve blocks the flow of fluid between said fluid inlet and discharge of said feed supply compartment when the tank is full of permeate and increases in pressure.

7. The pump and shut off valve of claim 1, wherein said drive includes a motor which is coupled to said drive shaft to drive it.

8. The pump and shut off valve of claim 1, wherein said drive transmitting connector is a crank arm.

9. The pump and shut off valve of claim 1, wherein said valve in said feed supply compartment comprises a piston which moves reciprocally in said compartment between a first position in which said flow of fluid between said fluid inlet and discharge of said feed supply compartment is permitted, and a second position in which said flow of fluid between said fluid inlet and discharge of said feed supply compartment is blocked.

10. The pump and shut off valve of claim 9, including a spring in said feed supply compartment which urges said valve toward one of said positions.

11. The pump and shut off valve of claim 10, wherein said spring urges said piston toward said second position.

12. The pump and shut off valve of claim 10, wherein said spring urges said piston toward said first position.

13. The pump and shut off valve of claim 1, including a spring in said supply compartment which urges said valve in a direction which tends to block the flow of fluid between said fluid inlet and said discharge of said supply compartment.

14. The pump and shut off valve of claim 1, including a spring in said supply compartment which urges said valve in a direction which tends to permit the flow of fluid between said fluid inlet and said discharge of said supply compartment.

15. The pump and shut off valve of claim 1, in combination with a reverse osmosis water purification system including: a reverse osmosis membrane in a pressure vessel, said vessel having a feed inlet, a feed discharge and a permeate discharge; a tank for receiving the permeate from said permeate discharge; and wherein a source of feed to be purified communicates with said fluid inlet to said feed supply compartment; the feed to be purified from the fluid discharge from said feed supply compartment communicates with said feed inlet of said vessel; the permeate from the permeate discharge of said vessel communicates with said first and second fluid inlets for introducing fluid to said first and second chambers, and the permeate from said first and second fluid discharges for discharging the fluid from said first and second chambers, respectively, communicates with said tank.

16. The pump and shut off valve of claim 15, wherein said valve blocks the flow of fluid between said fluid inlet and discharge of said feed supply compartment when the tank is full of permeate and increases in pressure.

* * * * *